(12) United States Patent
Iwano et al.

(10) Patent No.: US 11,732,523 B2
(45) Date of Patent: Aug. 22, 2023

(54) VEHICLE POWER WINDOW CONTROL DEVICE

(71) Applicant: Toyota Jidosha Kabushiki Kaisha, Toyota (JP)

(72) Inventors: Yoshihiro Iwano, Toyota (JP); Masaki Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 740 days.

(21) Appl. No.: 16/665,226

(22) Filed: Oct. 28, 2019

(65) Prior Publication Data
US 2020/0131839 A1  Apr. 30, 2020

(30) Foreign Application Priority Data
Oct. 30, 2018  (JP) .................................. 2018-204182

(51) Int. Cl.
*E05F 15/73* (2015.01)
*B60J 1/17* (2006.01)
*G06F 3/01* (2006.01)

(52) U.S. Cl.
CPC .................. *E05F 15/73* (2015.01); *B60J 1/17* (2013.01); *G06F 3/011* (2013.01)

(58) Field of Classification Search
CPC .............. E05F 15/73; B60J 1/17; G06F 3/011
See application file for complete search history.

(56) References Cited

U.S. PATENT DOCUMENTS

| 6,657,140 B2* | 12/2003 | Rantet | H01H 13/702 200/5 R |
| 7,638,719 B2* | 12/2009 | Pelletier | H01H 13/702 200/5 E |
| 9,143,126 B2* | 9/2015 | Salter | H03K 17/955 |
| 10,233,686 B2* | 3/2019 | Smith | B60J 1/17 |
| 10,493,826 B2* | 12/2019 | Schwarz | E05F 15/60 |
| 2001/0052715 A1* | 12/2001 | McAndrew | B60R 11/0264 296/146.7 |
| 2007/0182215 A1* | 8/2007 | Rose | B60R 16/005 296/211 |

(Continued)

FOREIGN PATENT DOCUMENTS

| CN | 104278908 A | 1/2015 |
| CN | 106064592 A | 11/2016 |

(Continued)

*Primary Examiner* — Nay Tun
(74) *Attorney, Agent, or Firm* — Dinsmore & Shohl LLP

(57) ABSTRACT

A vehicle power window control device includes an opening-closing section, a detection section, and a controller. The opening-closing section is disposed at a side door of a vehicle, and is configured to move window glass provided at the side door. The detection section is disposed at a location further toward a vehicle upper side than an armrest of the side door and further toward a vehicle front side than a door inner handle of the side door, and is configured to detect a hand movement by an occupant within a detection region set at a vehicle inner side of the location. The controller closes the window glass in a case in which an upward hand movement by the occupant has been detected by the detection section, and opens the window glass in a case in which a downward hand movement by the occupant has been detected by the detection section.

10 Claims, 7 Drawing Sheets

(56) References Cited

U.S. PATENT DOCUMENTS

| | | | |
|---|---|---|---|
| 2015/0019083 A1 | 1/2015 | Kalliomaki et al. | |
| 2016/0004362 A1* | 1/2016 | Kring | H05K 1/0298 |
| | | | 345/174 |
| 2016/0096509 A1* | 4/2016 | Ette | G06F 3/017 |
| | | | 382/103 |
| 2016/0193976 A1* | 7/2016 | Wild | G06F 3/044 |
| | | | 701/36 |
| 2016/0305178 A1 | 10/2016 | Disley et al. | |
| 2017/0057357 A1* | 3/2017 | Borghi | E05F 15/689 |
| 2017/0270924 A1* | 9/2017 | Fleurence | G10L 15/22 |
| 2017/0361685 A1* | 12/2017 | Schwarz | E05F 15/60 |
| 2018/0111546 A1* | 4/2018 | Salter | B60Q 3/76 |
| 2018/0266164 A1 | 9/2018 | Yogo | |
| 2019/0135199 A1* | 5/2019 | Galan Garcia | B60K 35/00 |
| 2019/0136604 A1* | 5/2019 | Stebbins | E05F 15/695 |
| 2019/0255917 A1* | 8/2019 | Nakano | B60J 1/17 |
| 2020/0033985 A1* | 1/2020 | Abe | G06F 3/0488 |

FOREIGN PATENT DOCUMENTS

| | | |
|---|---|---|
| EP | 1046565 A2 | 10/2000 |
| JP | 2000-306469 A | 11/2000 |
| JP | 2006-132252 A | 5/2006 |
| JP | 2010-013824 A | 1/2010 |
| JP | 2014-237929 A | 12/2014 |
| JP | 2017-171287 A | 9/2017 |
| JP | 2018-154223 A | 10/2018 |

\* cited by examiner

VEHICLE POWER WINDOW CONTROL DEVICE

CROSS-REFERENCE TO RELATED APPLICATION

This application is based on and claims priority under 35 USC § 119 from Japanese Patent Application No. 2018-204182 filed on Oct. 30, 2018, the disclosure of which is incorporated by reference herein.

BACKGROUND

Technical Field

The present disclosure relates to a vehicle power window control device.

Related Art

Japanese Patent Application Laid-Open (JP-A) No. 2006-132252 discloses a vehicle power window control device in which a drive motor is rotated forward in or in reverse by operating a power window switch in order to move vehicle window glass up or down so as to open or close a window.

In the above related art, the position of the power window switch needs to be accurately ascertained in order to operate the power window switch, and there is therefore room for improvement from the perspective of enabling a window glass opening-closing operation to be performed in a smoother manner.

SUMMARY

In consideration of the above circumstances, an object of the present disclosure is to obtain a vehicle power window control device enabling a window glass opening-closing operation to be performed in a smoother manner than hitherto.

A vehicle power window control device of a first aspect of the present disclosure includes an opening-closing section, a detection section, and a controller. The opening-closing section is disposed at a side door of a vehicle, and is configured to move window glass provided at the side door up or down so as to open or close the window glass. The detection section is disposed at a location further toward a vehicle upper side than an armrest of the side door and further toward a vehicle front side than a door inner handle of the side door, and is configured to detect a hand movement by an occupant within a detection region set at a vehicle inner side of the location. The controller closes the window glass using the opening-closing section in a case in which an upward hand movement by the occupant has been detected by the detection section, and opens the window glass using the opening-closing section in a case in which a downward hand movement by the occupant has been detected by the detection section.

In the first aspect, the opening-closing section disposed at the side door of the vehicle moves the window glass provided at the side door up or down so as to open or close the window glass. The detection section disposed at the side door detects a hand movement by an occupant within the detection region set at the vehicle inner side of the location of the detection section. In a case in which the detection section has detected an upward hand movement by an occupant, the controller closes the window glass using the opening-closing section. In a case in which the detection section has detected a downward hand movement by an occupant, the controller opens the window glass using the opening-closing section. The opening-closing operation of the window glass is performed based on upward or downward hand movement by an occupant in this manner. This not only eliminates the need to accurately ascertain the position of a power window switch in order to operate the power window switch, as was required hitherto, but also enables operation of the switch based on an intuitive hand movement. This enables the opening-closing operation of the window glass to be performed in a smoother manner than hitherto. Furthermore, the detection section is disposed further toward the vehicle upper side than the armrest and further toward the vehicle front side than the door inner handle of the side door, namely, at a location where normal hand movement by an occupant is unlikely to be detected, thereby enabling unintentional opening or closing of the window glass to be prevented or suppressed.

A vehicle power window control device of a second aspect of the present disclosure is the first aspect, wherein the controller stops movement of the window glass by the opening-closing section in a case in which the detection section has detected a hand movement by the occupant in an opposite direction to a movement direction of the window glass partway through movement of the window glass by the opening-closing section.

Due to having the configuration described above, the second aspect enables an occupant to stop movement of the window glass at a desired position by an intuitively understood hand movement in the opposite direction.

A vehicle power window control device of a third aspect of the present disclosure is the first aspect, wherein the detection section has an elongated shape with a length along a vehicle vertical direction as viewed along a vehicle width direction.

In the third aspect, the detection section disposed further toward the vehicle upper side than the armrest of the side door and further toward the vehicle front side than the door inner handle of the side door has an elongated shape with length along the vehicle vertical direction as viewed along the vehicle width direction. Thus, the detection section is easily disposed in a narrow region further toward the vehicle front side than the door inner handle of the side door. Moreover, since the length direction of the detection section is aligned with the upward or downward hand movement by an occupant, the upward or downward hand movement by the occupant is easily detected by the detection section.

A vehicle power window control device of a fourth aspect of the present disclosure is the first aspect, wherein the opening-closing section and the detection section are respectively disposed at a driver seat side door and a front passenger seat side door, and the detection region of the detection section disposed at the front passenger seat side door is set to a range that can be reached by an occupant seated in a driver seat by stretching an arm toward a front passenger seat side.

In the fourth aspect, the opening-closing section and the detection section are respectively disposed at the driver seat side door and the front passenger seat side door of the vehicle. The detection region of the detection section disposed at the front passenger seat side door is set to a range that can be reached by an occupant seated in the driver seat by stretching their arm toward the front passenger seat side. Thus, the occupant seated in the driver seat can open or close the window glass provided at the front passenger seat side door by stretching their arm toward the front passenger seat side and moving their hand up or down.

A vehicle power window control device of a fifth aspect of the present disclosure is the first aspect, wherein the opening-closing section and the detection section are respectively disposed at plural of the side doors including a driver seat side door, and the controller includes a function disabling switch that is operable by an occupant seated in a driver seat. Functioning of the detection sections and the opening-closing sections respectively disposed at the side doors other than the driver seat side door is disabled by switching the function disabling switch ON.

In the fifth aspect, the controller disables function of the detection sections or the opening-closing sections respectively disposed at the side doors other than the driver seat side door (such as a front passenger seat side door and rear passenger seat side doors) when an occupant seated in the driver seat switches the function disabling switch ON. Thus, for example, in a case in which children are seated in the front passenger seat and the rear passenger seats, unintentional opening or closing of the window glass of the front passenger seat side door and rear passenger seat side doors by the children moving their hands can be prevented.

A vehicle power window control device of a sixth aspect of the present disclosure is the first aspect, wherein the opening-closing section and the detection section are respectively disposed at plural of the side doors including a driver seat side door, and the controller includes an operation switch that is disposed at an instrument panel, a center console, or a steering wheel of the vehicle and that is operable by an occupant seated in a driver seat. The opening-closing sections respectively disposed at the side doors other than the driver seat side door can be activated by operating the operation switch.

In the sixth aspect, an occupant seated in the driver seat is able to activate the opening-closing sections respectively disposed at the side doors other than the driver seat side door (such as a front passenger seat side door and rear passenger seat side doors) by operating the operation switch. The occupant seated in the driver seat is therefore able to open or close the window glass of the side doors other than the driver seat side door. Moreover, the operation switch is disposed at the instrument panel, the center console, or the steering wheel of the vehicle, thereby increasing the degrees of freedom for design (the degrees of freedom for styling) of the driver seat side door compared, for example, to cases in which the operation switch is disposed at the driver seat side door.

As described above, the vehicle power window control device according to the present disclosure enables a window glass opening-closing operation to be performed in a smoother manner than hitherto.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle power window control device 10 according to a first exemplary embodiment of the present disclosure, with reference to FIG. 1 to FIG. 9. In each of the drawings, the arrow FR, the arrow LH, and the arrow UP respectively indicate a forward direction (direction of progress), a left direction, and an upward direction of a vehicle as appropriate. Unless specifically stated otherwise, in the below explanation, simple reference to front and rear, left and right, and up and down directions refers to the front and rear in a vehicle front-rear direction, the left and right in a vehicle left-right direction (vehicle width direction), and up and down in a vehicle vertical direction.

Configuration

Figure 1:
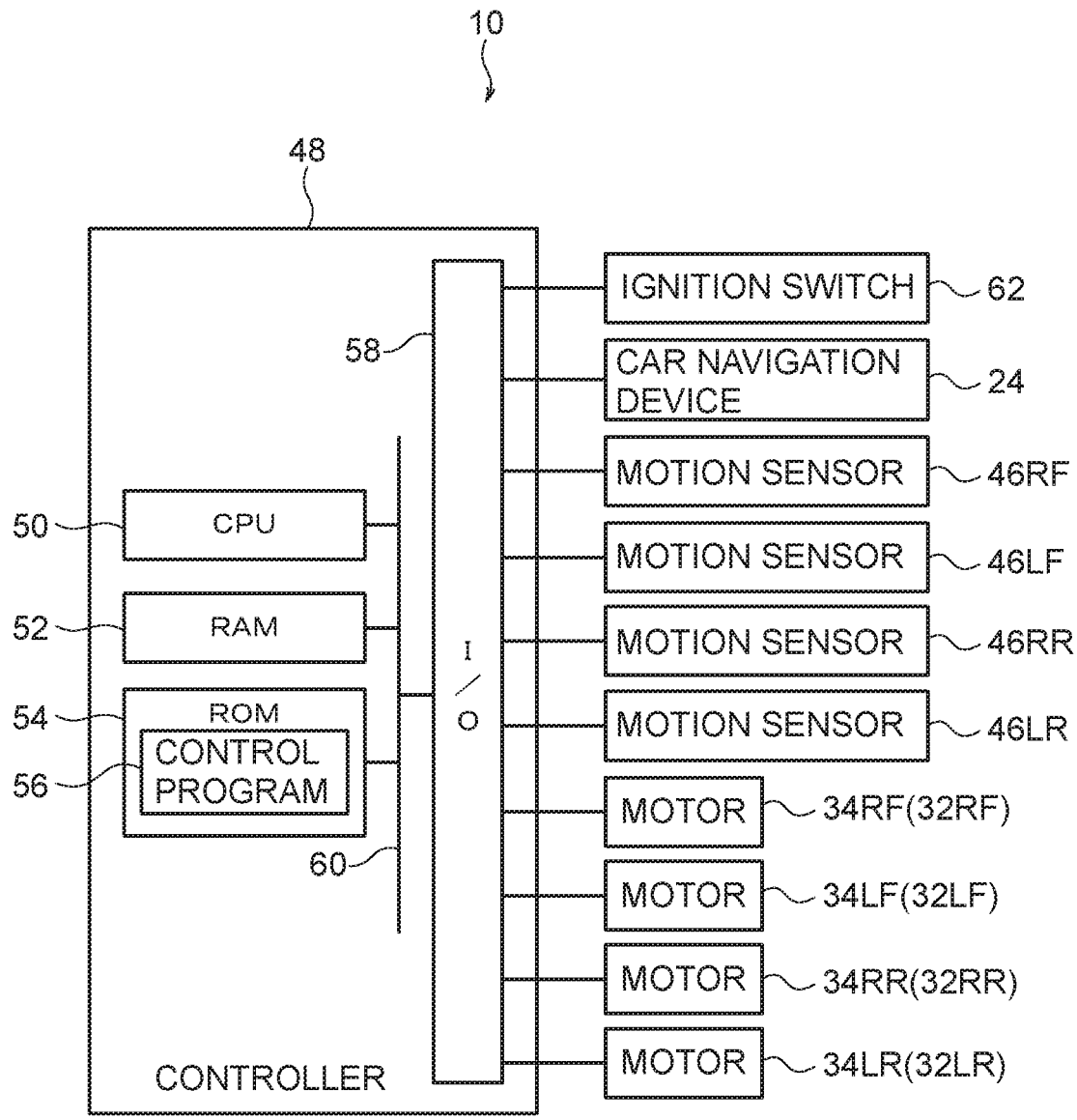
FIG. 1 is a block diagram illustrating configuration of a vehicle power window control device according to a first exemplary embodiment of the present disclosure.
Figure 2:
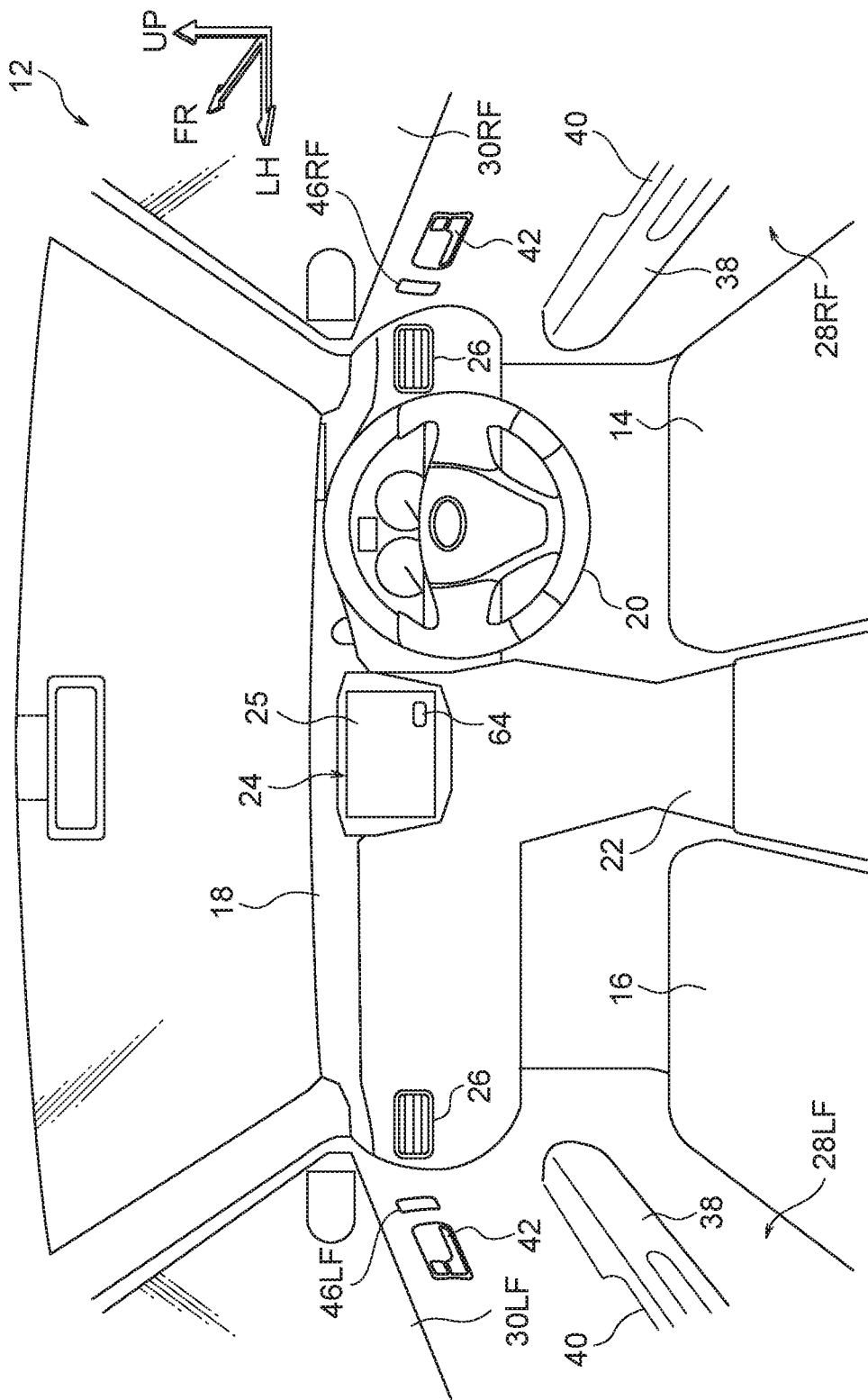
FIG. 2 is a perspective view illustrating configuration of a vehicle cabin front section of a vehicle applied with a vehicle power window control device according to the first exemplary embodiment.
Figure 3:
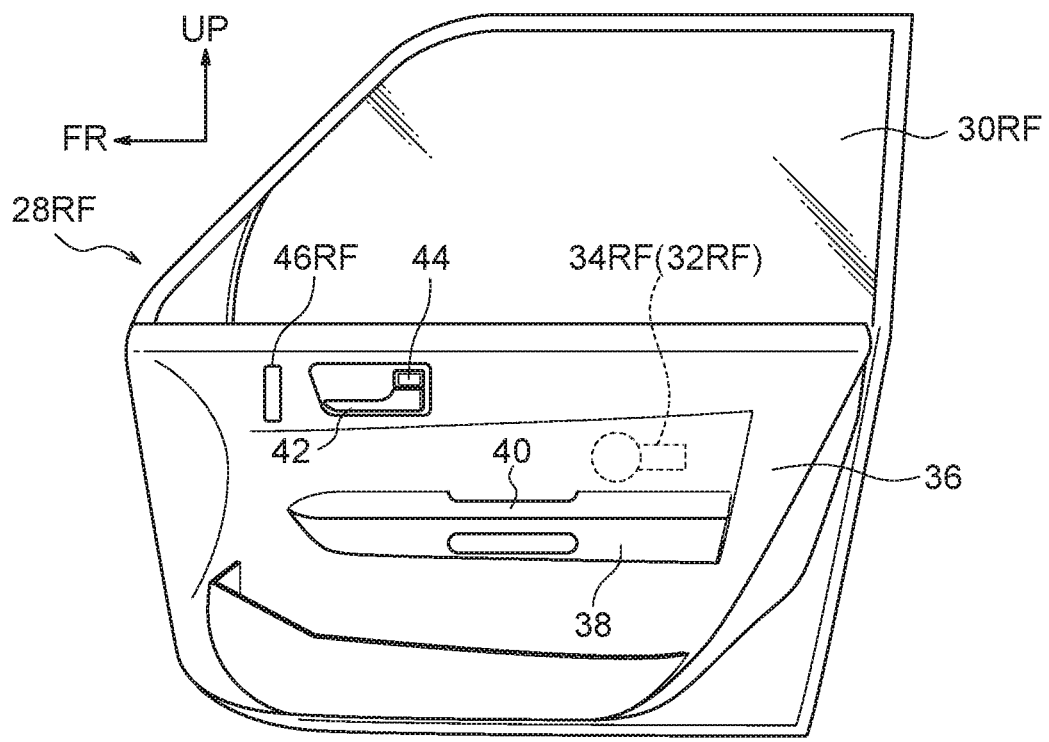
FIG. 3 is a face-on view illustrating a right front side door (a driver seat side door) in a state viewed from the vehicle inner side.
Figure 4:
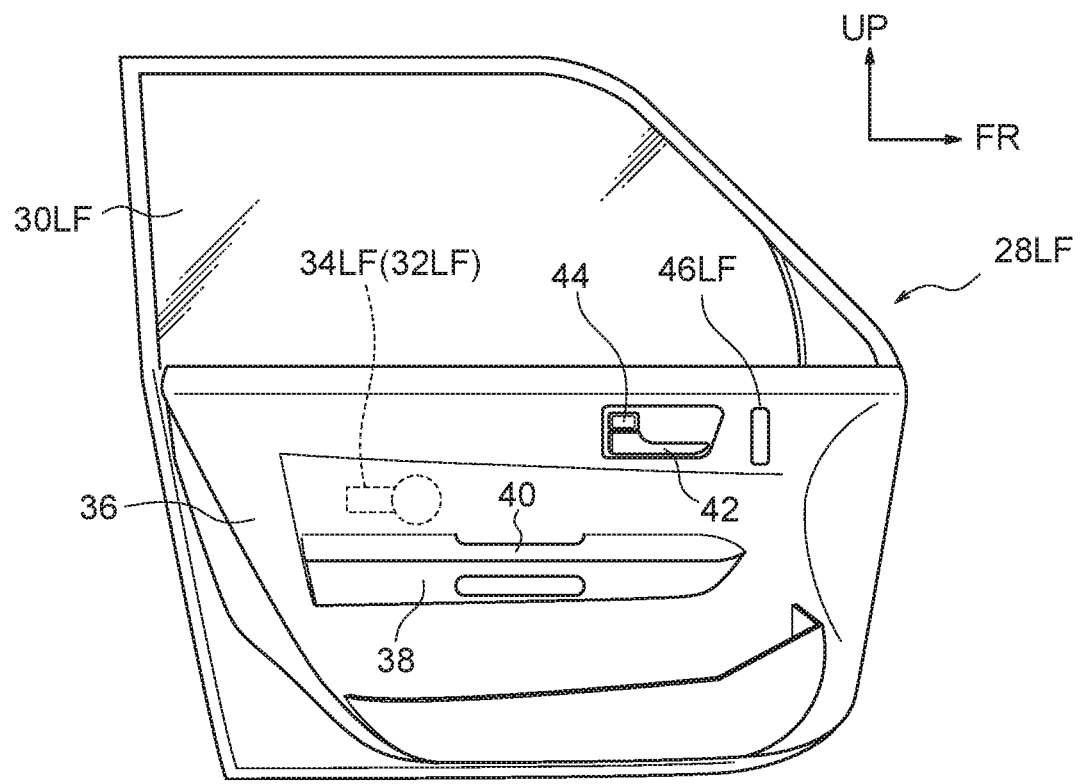
FIG. 4 is a face-on view illustrating a left front side door (a front passenger seat side door) in a state viewed from the vehicle inner side.
Figure 5:
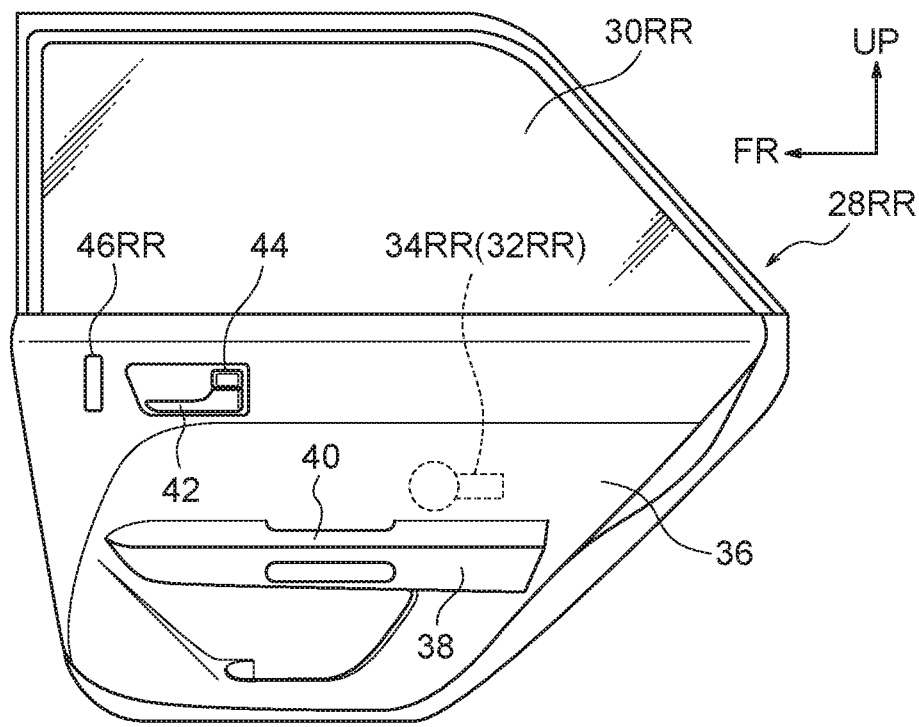
FIG. 5 is a face-on view illustrating a right rear side door in a state viewed from the vehicle inner side.
Figure 6:
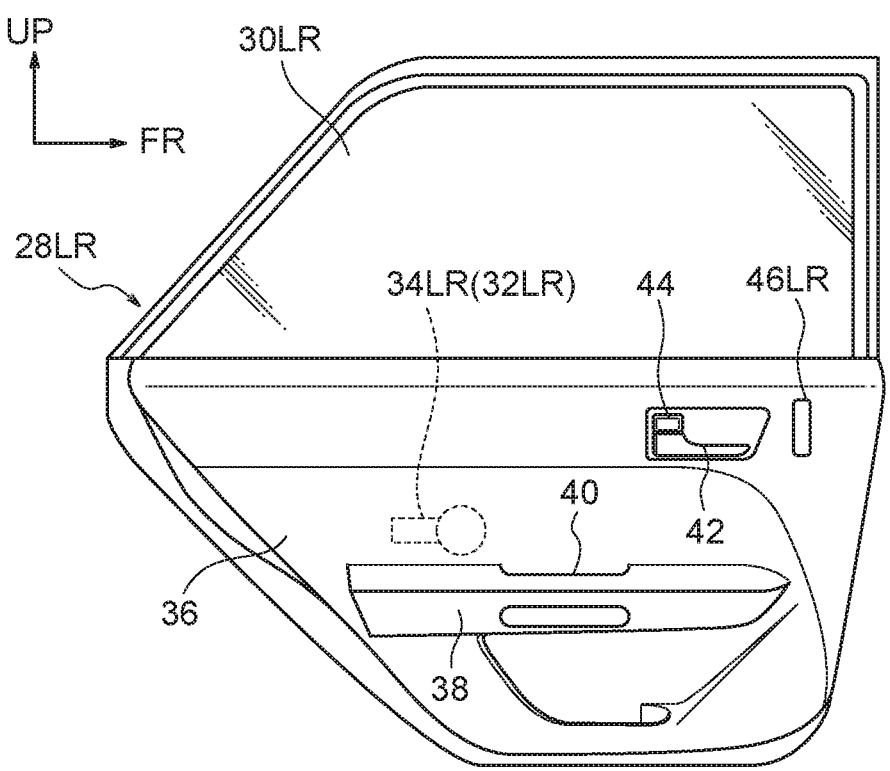
FIG. 6 is a face-on view illustrating a left rear side door in a state viewed from the vehicle inner side.

FIG. 1 is a block diagram illustrating configuration of the vehicle power window control device 10 according to the present exemplary embodiment. FIG. 2 is a perspective view illustrating configuration of a vehicle cabin front section of a vehicle 12 applied with the vehicle power window control device 10. The vehicle 12 is for example a right-hand drive sedan type vehicle. A driver seat 14 is disposed on the right side of the vehicle cabin front section, and a front passenger seat 16 is disposed on the left side of the vehicle cabin front section of the vehicle 12. An instrument panel 18 is disposed in front of the driver seat 14 and the front passenger seat 16. A steering wheel 20 is disposed in front of the driver seat 14. A center console 22 is disposed between the driver seat 14 and the front passenger seat 16. A left-right direction center portion of the instrument panel 18 is integrally connected to a front end portion of the center console 22. A car navigation device 24 is provided at the left-right direction center portion of the instrument panel 18, and side registers 26, each serving as a blower outlet for conditioned air, are respectively provided at both left-right direction end portions of the instrument panel 18. A display unit 25 of the car navigation device 24 is configured by a touch panel that is capable of being touch-operated, for example by an occupant seated in the driver seat 14. Note if the vehicle 12 were a left-hand drive vehicle, the configuration would have left-right symmetry to that of the present exemplary embodiment.

A right front side door 28RF (see FIG. 3), serving as a driver seat side door, is disposed on the right side of the driver seat 14. A left front side door 28LF (see FIG. 4), serving as a front passenger seat side door, is disposed on the left side of the front passenger seat 16. The front side doors 28RF, 28LF are configured with left-right symmetry to each other. Rear passenger seats (rear seats), not illustrated in the drawings, are disposed at the rear of the driver seat 14 and the front passenger seat 16 in the vehicle 12. A right rear side door 28RR (see FIG. 5) is disposed on the right side of the rear passenger seats, and a left rear side door 28LR (see FIG. 6) is disposed on the left side of the rear passenger seats. The rear side doors 28RR, 28LR are both rear passenger seat side doors, and are configured with left-right symmetry to each other. In the below explanation, the right front side door 28RF, the left front side door 28LF, the right rear side door 28RR, and the left rear side door 28LR are sometimes collectively referred to as the "side doors 28RF, 28LF, 28RR, 28LR" or the "side doors 28".

Window openings (not appended with reference numerals) respectively closed off by window glass 30RF, 30LF, 30RR, 30LR are respectively formed at upper portions of the side doors 28RF, 28LR, 28RR, 28LR. Power window devices 32RF, 32LF, 32RR, 32LR that move the respective window glass 30RF, 30LF, 30RR, 30LR up or down so as to open or close the window glass using drive force of respective motors 34RF, 34LF, 34RR, 34LR (see FIG. 1, FIG. 3 to FIG. 6) are disposed inside lower portions of the respective side doors 28RF, 28LF, 28RR, 28LR. The power window devices 32RF, 32LF, 32RR, 32LR each correspond to an "opening-closing section" of the present disclosure. In the below explanation, the power window devices 32RF, 32LF, 32RR, 32LR are sometimes collectively referred to as the "power window devices 32", the window glass 30RF, 30LF, 30RR, 30LR are sometimes collectively referred to as the "window glass 30", and the motors 34RF, 34LF, 34RR, 34LR are sometimes collectively referred to as the "motors 34".

A door trim panel 36 is attached to the vehicle inner side of the lower portion of each of the side doors 28. Each of the door trim panels 36 is provided with an armrest 38 and a door inner handle 42. Each of the armrests 38 is disposed at a vertical direction center portion of the corresponding door trim panel 36, extends along the vehicle front-rear direction, and projects toward the vehicle inner side. A door grip 40 that is gripped by an occupant when the occupant opens or closes the corresponding side door 28 is integrally provided to a front-rear direction center portion of each of the armrests 38.

The door inner handle 42 is rotation-operated by an occupant inside the vehicle cabin in order to release locking of the corresponding side door 28, and is disposed at an upper front end of the corresponding door trim panel 36. A recess (not appended with reference numerals) that is recessed toward the vehicle width direction outer side is formed in each of the side doors 28 at the location of the corresponding door inner handle 42, and the door inner handle 42 is housed inside the recess. A door lock button 44 (reference numerals are omitted in FIG. 2) that disables operation of the door inner handle 42 is disposed inside the corresponding recess at the upper side of the door inner handle 42.

In the present exemplary embodiment, motion sensors 46RF, 46LF, 46RR, 46LR, serving as detection sections, are disposed at the respective side doors 28RF, 28LF, 28RR, 28LR. The motion sensors 46RF, 46LF, 46RR, 46LR are disposed further toward the vehicle upper side than the respective armrests 38, and further toward the vehicle front side than the respective door inner handles 42. In the present exemplary embodiment, the motion sensors 46RF, 46LF, 46RR, 46LR are disposed close to and to the vehicle front sides of the respective door inner handles 42. As illustrated in FIG. 2, the motion sensors 46RF, 46LF respectively disposed at the left and right front side doors 28RF, 28LF are disposed close to and to the vehicle rear sides of the side registers 26 disposed at both the left-right direction end portions of the instrument panel 18. The motion sensors 46RF, 46LF, 46RR, 46LR are each formed in an elongated shape with length along the vehicle vertical direction as viewed along the vehicle width direction, and are disposed inside the respective side doors 28RF, 28LF, 28RR, 28LR in a state partially exposed in the vehicle cabin through openings (not appended with reference numerals) formed in the respective door trim panels 36. In the below explanation, the motion sensors 46RF, 46LF, 46RR, 46LR are sometimes collectively referred to as the "motion sensors 46".

Each of the motion sensors 46 is configured to detect movement of a detection target object (the hand of an occupant in this case) within a detection region set at the vehicle inner side of the location of the motion sensor 46. Specifically, for example, each of the motion sensors 46 is configured so as to detect movement of a target object by shining light onto the target object from an infrared light-emitting LED, and identifying changes in reflected light using a light receiving element. The detection region of each of the motion sensors 46RF, 46RR, 46LR is, for example, set to within a range of approximately 15 cm toward the vehicle width direction inner side from the corresponding motion sensor 46RF, 46RR, 46LR. The detection region of the motion sensor 46LF is set wider than the detection regions of the motion sensors 46RF, 46RR, 46LR, and is set to a range that can be reached by an occupant (such as an occupant with a physical build equivalent to an AF05 dummy) seated in the driver seat 14 stretching their arm toward the front passenger seat 16 side. The motion sensors 46 are electrically connected to a controller 48 (see FIG. 1).

The controller 48 includes a Central Processing Unit (CPU) 50, Random Access Memory (RAM) 52, Read Only Memory (ROM) 54, and an input/output interface (I/O) 58 for communicating with external devices. These components are connected together though a bus 60. Note that the controller 48 may be configured from plural electronic control units, and may be implemented by either hardware or software.

An ignition switch 62 of the vehicle 12 is electrically connected to the I/O 58. The car navigation device 24, the motion sensors 46RF, 46LF, 46RR, 46LR described above, and the motors 34RF, 34LF, 34RR, 34LR are also electrically connected to the I/O 58. In the controller 48, a control program 56 stored in the ROM 54 is read and expanded in the RAM 52, and the expanded control program 56 is executed by the CPU 50.

The controller 48 is able to detect a fully open state and a fully closed state of each of the window glass 30RF, 30LF, 30RR, 30LR, for example by counting the number of pulses output from a pulse emitter (not illustrated in the drawings) provided to each of the motors 34RF, 34LF, 34RR, 34LR. The controller 48 also controls activation of each of the motors 34RF, 34LF, 34RR, 34LR based on output from the respective motion sensors 46RF, 46LF, 46RR, 46LR.

Specifically, when any of the motion sensors 46 detects an upward hand movement by an occupant, in a case in which the window glass 30 of the side door 28 to which this motion sensor 46 is disposed is not in the fully closed state, the controller 48 forward rotates the motor 34 of the power window device 32 disposed at the corresponding side door 28 so as to close (to move in a closing direction) the window glass 30 that is not in the fully closed state.

Moreover, when any of the motion sensors 46 detects a downward hand movement by an occupant, in a case in which the window glass 30 of the side door 28 to which this motion sensor 46 is disposed is not in the fully open state, the controller 48 reverse rotates the motor 34 of the power window device 32 disposed at the corresponding side door 28 so as to open (to move in an opening direction) the window glass 30 that is not in the fully open state.

Figure 7:
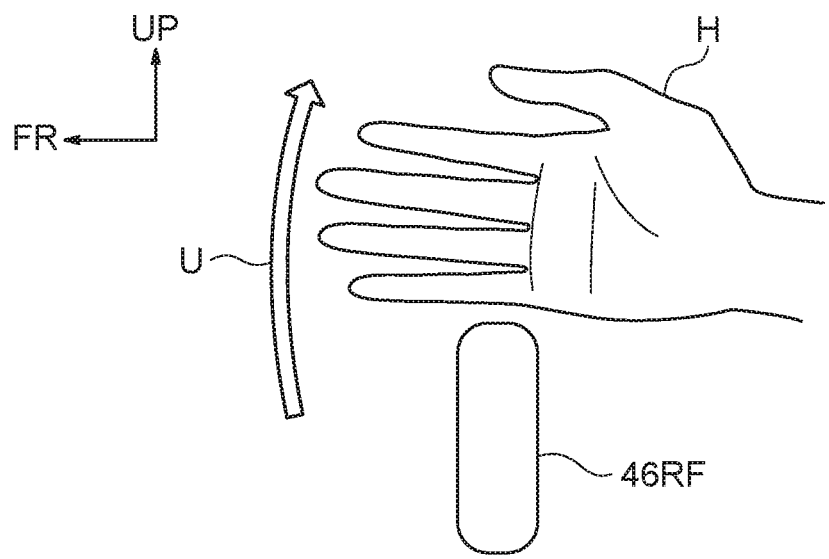
FIG. 7 is a drawing illustrating an example of a case in which an occupant has moved their hand upward within a detection region of a motion sensor (a detection section)
Figure 8:
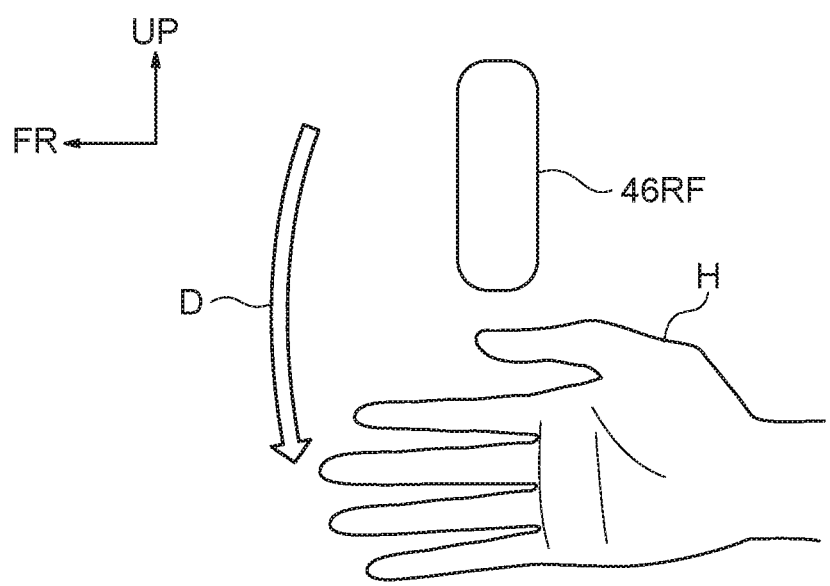
FIG. 8 is a drawing illustrating an example of a case in which an occupant has moved their hand downward within a detection region of a motion sensor.

FIG. 7 illustrates an example of a case in which an occupant seated in the driver seat 14 has moved their hand upward (see the arrow U in FIG. 7) within the detection region of the motion sensor 46RF. FIG. 8 illustrates an example of a case in which an occupant seated in the driver seat 14 has moved their hand H downward (see the arrow D in FIG. 8) within the detection region of the motion sensor 46RF.

Furthermore, when a hand movement has been detected by any of the motion sensors 46 and the corresponding window glass 30 is partway through being moved by the corresponding power window device 32 as a result, in a case in which this motion sensor 46 then detects a hand movement by the occupant in the opposite direction to the movement direction of the corresponding window glass 30, the controller 48 stops the movement of the window glass 30 by this power window device 32.

Moreover, in a state in which a function disabling switch (window lock switch) 64 illustrated in FIG. 2 is ON, the controller 48 disables the function of the motion sensors 46LF, 46RR, 46LR disposed at the side doors 28 (the left front side door 28LF, the right rear side door 28RR, and the left rear side door 28LR) other than the right front side door 28RF (the driver seat side door). Note that the controller 48 may be configured so as to disable function of the power window devices 32LF, 32RR, 32LR when the function disabling switch 64 is in the ON state. Although the function disabling switch 64 is a software based, virtual switch capable of being displayed on the display unit 25 of the car navigation device 24 (namely, at the left-right direction center portion of the instrument panel 18) in the present exemplary embodiment, there is no limitation thereto. Namely, it is sufficient that a function disabling switch be disposed at a position where it can be operated by the occupant seated in the driver seat 14, and this may be configured by a hardware based switch disposed at the instrument panel 18, the center console 22, or the steering wheel 20.

Figure 9:
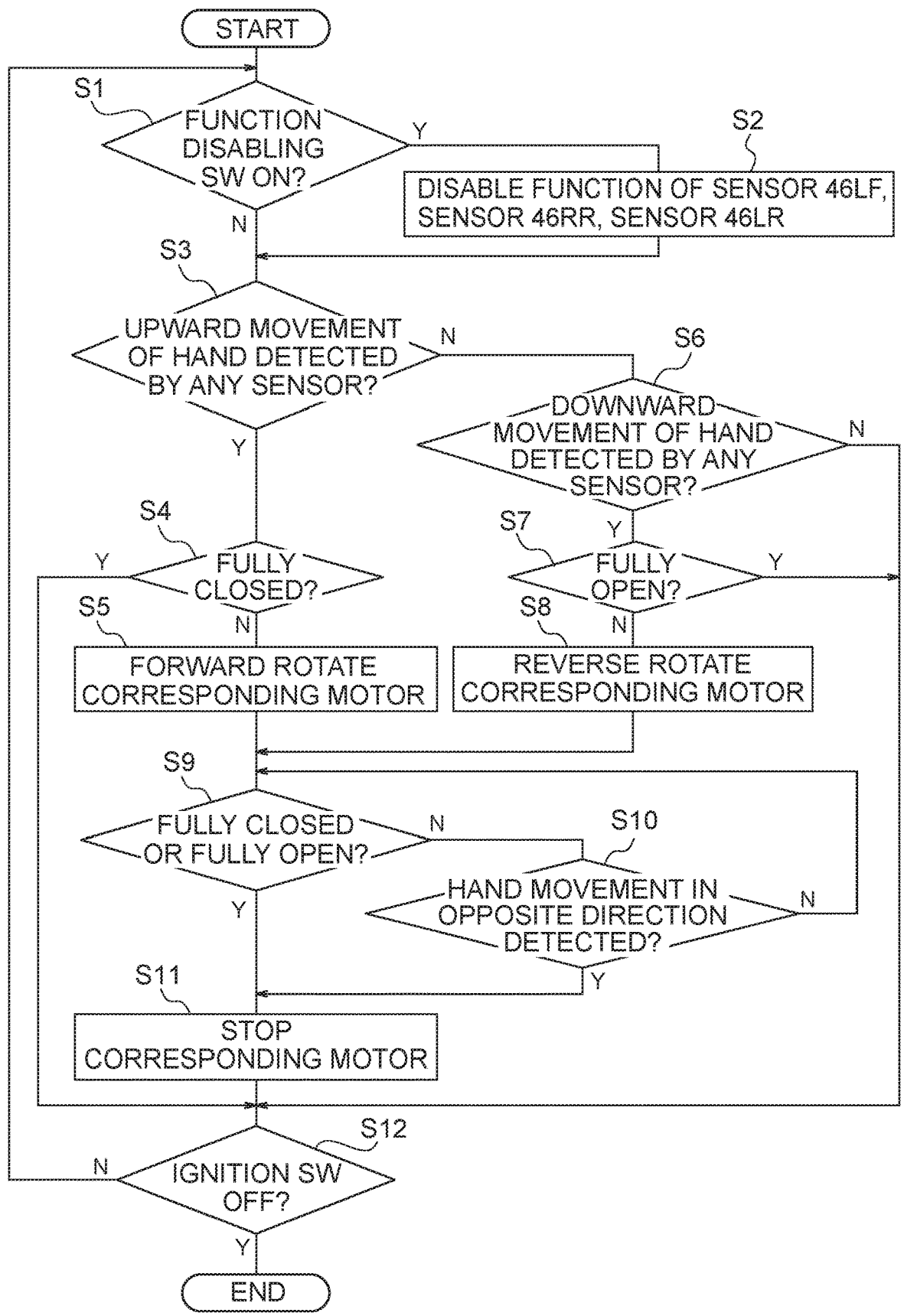
FIG. 9 is a flowchart illustrating a flow of processing executed by a controller of a vehicle power window control device according to the first exemplary embodiment.

Explanation follows regarding control processing executed by the controller 48, with reference to the flowchart illustrated in FIG. 9. Note that in FIG. 9, "sensor" refers to the motion sensors 46 as a whole, "sensors 46LF, 46RR, 46LR" refers to the motion sensors 46LF, 46RR, 46LR, "ignition SW" refers to the ignition switch 62, and "function disabling SW" refers to the function disabling switch 64.

The controller 48 begins execution of the control program 56 when the ignition switch 62 is switched ON. When execution of the control program 56 begins, first, at step S1, the controller 48 determines whether or not the function disabling switch 64 has been switched ON. In a case in which affirmative determination is made, processing transitions to step S2, and in a case in which negative determination is made, processing transitions to step S3.

At step S2, the controller 48 disables functioning of the motion sensors 46LF, 46RR, 46LR disposed at the side doors 28 (the left front side door 28LF, the right rear side door 28RR, and the left rear side door 28LR) other than the right front side door 28RF (the driver seat side door). When the processing of step S2 is complete, processing transitions to step S3.

At step S3, the controller 48 determines whether or not an upward hand movement by an occupant has been detected by any of the motion sensors 46RF, 46LF, 46RR, 46LR. In a case in which affirmative determination is made, processing transitions to step S4, and in a case in which negative determination is made, processing transitions to step S6. Note that in a case in which the function of the motion sensors 46LF, 46RR, 46LR has been disabled at step S2, the motion sensors 46LF, 46RR, 46LR do not attempt to detect upward hand movement by an occupant at step S3.

At step S4, the controller 48 determines whether or not the window glass 30 of the side door 28 disposed with the motion sensor 46 that has detected an upward hand movement by an occupant is in a fully closed state. In a case in which affirmative determination is made, processing transitions to step S12, and in a case in which negative determination is made, processing transitions to step S5.

At step S5, the controller 48 forward rotates the motor 34 corresponding to the motion sensor 46 that has detected an upward hand movement by an occupant, namely, the motor 34 disposed at the side door 28 disposed with the motion sensor 46 that has detected an upward hand movement by an occupant. The window glass 30 disposed at the side door 28 disposed with the forward-rotating motor 34 thereby starts to move in the closing direction. When the processing of step S5 is complete, processing transitions to step S9.

At step S6, the controller 48 determines whether or not a downward hand movement by an occupant has been detected by any of the motion sensors 46RF, 46LF, 46RR, 46LR. In a case in which affirmative determination is made, processing transitions to step S7, and in a case in which negative determination is made, processing transitions to step S12. Note that in a case in which the function of the motion sensors 46LF, 46RR, 46LR has been disabled at step S2, the motion sensors 46LF, 46RR, 46LR do not attempt to detect downward hand movement by an occupant at step S6.

At step S7, the controller 48 determines whether or not the window glass 30 of the side door 28 disposed with the motion sensor 46 that has detected a downward hand movement by an occupant is in a fully open state. In a case in which affirmative determination is made, processing transitions to step S12, and in a case in which negative determination is made, processing transitions to step S8.

At step S8, the controller 48 reverse rotates the motor 34 corresponding to the motion sensor 46 that has detected downward hand movement by an occupant, namely, the motor 34 disposed at the side door 28 disposed with the motion sensor 46 that has detected a downward hand movement by an occupant. The window glass 30 disposed at the side door 28 disposed with the reverse-rotating motor 34 thereby starts to move in the opening direction. When the processing of step S8 is complete, processing transitions to step S9.

At step S9, the controller 48 determines whether or not the window glass 30 moved in the closing direction or the opening direction at step S5 or step S8 is in the fully closed state or the fully open state. In a case in which affirmative determination is made, processing transitions to step S11, and in a case in which negative determination is made, processing transitions to step S10.

At step S10, the controller 48 determines whether or not the motion sensor 46 that detected a hand movement by an occupant at step S3 or step S6 has detected a hand movement by the occupant in the opposite direction to the movement direction in which the window glass 30 is being moved as a result of this detection. In a case in which negative determination is made, processing returns to step S9, and in a case in which affirmative determination is made, processing transitions to step S11.

At step S11, the controller 48 stops the motor 34 that was forward rotated or reverse rotated at step S5 or step S8. When the processing of step S11 is complete, processing transitions to step S12.

At step S12, the controller 48 determines whether or not the ignition switch 62 has been switched OFF. In a case in which negative determination is made, processing returns to step S1 described above, and in a case in which affirmative determination is made, the control processing illustrated in FIG. 9 is ended.

Operation and Advantageous Effects

Explanation follows regarding operation and advantageous effects of the first exemplary embodiment.

In the vehicle power window control device 10 with the above configuration, the power window devices 32 disposed at the respective side doors 28 of the vehicle 12 move the window glass 30 provided at the respective side doors 28 up or down so as to open or close the window glass 30. The motion sensors 46 disposed at the side doors 28 each detect hand movement by an occupant within a detection region set at the vehicle inner side of the location of the corresponding motion sensor 46. In a case in which any of the motion sensors 46 has detected an upward hand movement by an occupant, the controller 48 closes the corresponding window glass 30 using the corresponding power window device 32. In a case in which any of motion sensors 46 has detected a downward hand movement by an occupant, the controller 48 opens the corresponding window glass 30 using the corresponding power window device 32. The opening and closing operations of the window glass 30 are performed based on upward or downward hand movement by an occupant in this manner. This not only eliminates the need to accurately ascertain the position of a power window switch in order to operate the power window switch, as was required hitherto, but also enables operation based on an intuitive hand movement. This enables the opening-closing operation of the window glass 30 to be performed in a smoother manner than hitherto.

Furthermore, each of the motion sensors 46 is disposed further toward the vehicle upper side than the armrest 38 and further toward the vehicle front side than the door inner handle 42 of the corresponding side door 28, namely, at a location where normal hand movement by an occupant is unlikely to be detected, thereby enabling unintentional opening or closing of the window glass 30 to be prevented or suppressed.

Moreover, in the present exemplary embodiment, in a case in which any of the motion sensors 46 detects a hand movement by an occupant in the opposite direction to the movement direction of the corresponding window glass 30 partway through movement of this window glass 30 by the corresponding power window device 32, the controller 48 stops movement of the window glass 30 by the power window device 32. This enables the occupant to stop movement of the window glass 30 at a desired position by an intuitively understood hand movement in the opposite direction.

Moreover, in the present exemplary embodiment, each of the motion sensors 46, disposed further toward the vehicle upper side than the armrest 38 and further toward the vehicle front side than the door inner handle 42 of the corresponding side door 28, is formed in an elongated shape with length along the vehicle vertical direction as viewed along the vehicle width direction. Thus, the motion sensor 46 is easily disposed in a narrow region further toward the vehicle front side than the door inner handle 42 of the corresponding side door 28. Moreover, since the length direction of the motion sensor 46 is aligned with the upward or downward hand movement by an occupant, the upward or downward hand movement by the occupant is easily detected by the motion sensor 46.

Furthermore, in the present exemplary embodiment, the detection region of the motion sensor 46LF disposed at the left front side door 28LF (the front passenger seat side door) is set to a range that can be reached by an occupant seated in the driver seat 14 by stretching their arm toward the front passenger seat 16 side. Thus, the occupant seated in the driver seat 14 can open or close the window glass 30LF provided at the left front side door 28LF by stretching their arm toward the front passenger seat 16 side and moving their hand up or down.

Moreover, in the present exemplary embodiment, when the function disabling switch 64 displayed on the display unit 25 of the car navigation device 24 is switched ON, for example by an occupant seated in the driver seat 14, the controller 48 disables the function of the motion sensors 46LF, 46RR, 46LR disposed at the side doors 28 (the left front side door 28LF, the right rear side door 28RR, and the left rear side door 28LR) other than the right front side door 28RF (the driver seat side door). Thus, for example, in a case in which children are seated in the front passenger seat 16 and rear passenger seats, unintentional opening or closing of the window glass 30LF, 30RR, 30LR of the left front side door 28LF, the right rear side door 28RR, and the left rear side door 28LR by the children moving their hands can be prevented.

Second Exemplary Embodiment

Explanation follows regarding a second exemplary embodiment of the present disclosure. Note that configuration and operation that are basically the same as in the first exemplary embodiment are appended with the same reference numerals as in the first exemplary embodiment, and explanation thereof is omitted.

Figure 10:
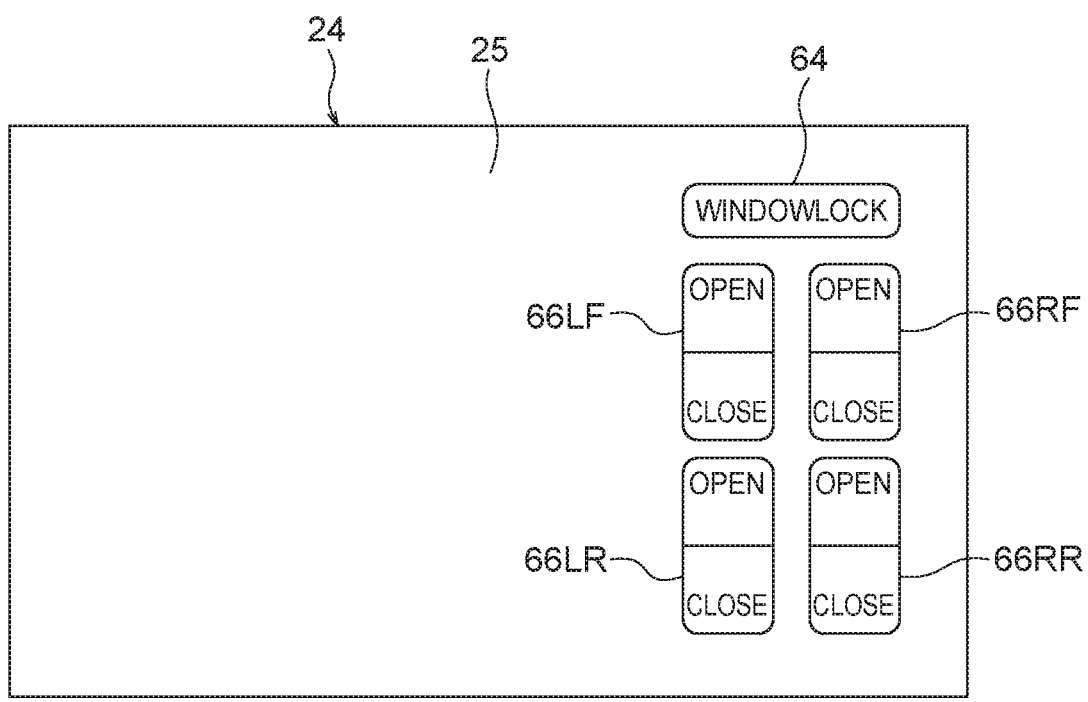
FIG. 10 is a face-on view illustrating a state in which a function disabling switch and plural operation switches are displayed on a display unit of a car navigation device in a vehicle power window control device according to a second exemplary embodiment of the present disclosure.

FIG. 10 is a face-on view illustrating a state in which the function disabling switch 64 and plural operation switches 66RF, 66LF, 66RR, 66LR are displayed on the display unit 25 of the car navigation device 24 in a vehicle power window control device according to the second exemplary embodiment of the present disclosure. The plural operation switches 66RF, 66LF, 66RR, 66LR correspond to the motors 34RF, 34LF, 34RR, 34LR of the power window devices 32RF, 32RR, 32RR, 32LR and the motors 34RF, 34LF, 34RR, 34LR are capable of being forward or reverse rotated by touch operation of the respective operation switches 66RF, 66LF, 66RR, 66LR. Namely, in the present exemplary embodiment, the power window devices 32LF, 32RR, 32LR disposed at the side doors 28 (the left front side door 28LF, the right rear side door 28RR, and the left rear side door 28LR) other than the right front side door 28RF (hereafter referred to as the "driver seat side door 28RF") can be activated by operation of the operation switches 66LF, 66RR, 66LR, which can be operated by an occupant seated in the driver seat 14.

Note that although the present exemplary embodiment includes the operation switch 66RF for activating the power window device 32RF disposed at the driver seat side door 28RF, there is no limitation thereto, and the operation switch 66RF may be omitted. Moreover, although the plural operation switches 66RF, 66LF, 66RR, 66LR are configured as software based switches capable of being displayed on the display unit 25 of the car navigation device 24 (namely, at the left-right direction center portion of the instrument panel 18) in the present exemplary embodiment, there is no limitation thereto. Namely, it is sufficient that plural operation switches be disposed at positions capable of being operated by an occupant seated in the driver seat 14, and hardware based switches may be disposed at the instrument panel 18, the center console 22, or the steering wheel 20.

Another configuration of the present exemplary embodiment is similar to that of the first exemplary embodiment. Thus, similar operation and advantageous effects to those in the first exemplary embodiment can also be obtained in the present exemplary embodiment. Moreover, in the present exemplary embodiment, an occupant seated in the driver seat 14 is able to activate the power window devices 32 disposed at the side doors 28 other than the driver seat side door 28RF by operating the respective operation switches 66LF, 66RR, 66LR. The occupant seated in the driver seat 14 is therefore able to open or close the window glass 30 of the side doors 28 other than the driver seat side door 28RF. Moreover, the operation switches 66RF, 66LF, 66RR, 66LR are disposed at the instrument panel 18 of the vehicle 12, thereby increasing the freedom of design (the freedom of styling) of the driver seat side door 28RF compared to cases in which the operation switches 66RF, 66LF, 66RR, 66LR are disposed at the driver seat side door 28RF.

Note that although the vehicle 12 is a sedan in the above exemplary embodiments, there is no limitation thereto, and the present disclosure may be applied to another type of vehicle, such as a coupe or a minivan.

Moreover, although in the above exemplary embodiments each of the motion sensors 46RF, 46LF, 46RR, 46LR, serving as detection sections, has an elongated shape with length along the vehicle vertical direction as viewed along the vehicle width direction, there is no limitation thereto, and the shape of the detection sections may be changed as appropriate.

Various other modifications may be implemented within a range not departing from the spirit of the present disclosure. The scope of rights of the present disclosure is not limited to the above exemplary embodiments.

What is claimed is:

1. A vehicle power window control device comprising:
    an opening-closing section that is disposed at a side door of a vehicle, and that is configured to move window glass provided at the side door up or down so as to open or close the window glass;
    a detection section that is disposed within a door trim panel at a location further toward a vehicle upper side than an armrest of the side door and in line with a door inner handle of the side door in a vehicle vertical direction, at a location further toward a vehicle front side than the door inner handle of the side door, and that is configured to detect a hand movement by an occupant within a detection region set at a vehicle inner side of the location, the detection section comprises one or more motion sensors configured to detect movement of a target object by shining light onto the target object from an infrared light-emitting LED, and identifying changes in reflected light using a light receiving element; and
    a controller that closes the window glass using the opening-closing section in a case in which an upward hand movement by the occupant has been detected by the detection section, and that opens the window glass using the opening-closing section in a case in which a downward hand movement by the occupant has been detected by the detection section.

2. The vehicle power window control device of claim 1, wherein the controller stops movement of the window glass by the opening-closing section in a case in which the detection section has detected a hand movement by the occupant in an opposite direction to a movement direction of the window glass, partway through movement of the window glass, by the opening-closing section.

3. The vehicle power window control device of claim 1, wherein the detection section has an elongated shape with a length along the vehicle vertical direction, as viewed along a vehicle width direction.

4. The vehicle power window control device of claim 1, wherein:
    the opening-closing section and the detection section are respectively disposed at a driver seat side door and a front passenger seat side door; and
    the detection region of the detection section disposed at the front passenger seat side door is set to a range that can be reached by an occupant seated in a driver seat by stretching an arm toward a front passenger seat side.

5. The vehicle power window control device of claim 1, wherein:
    the opening-closing section and the detection section are respectively disposed at a plurality of the side doors including a driver seat side door; and
    the controller includes a function disabling switch that is operated by an occupant seated in a driver seat, and functioning of the detection sections and the opening-closing sections respectively disposed at the side doors other than the driver seat side door is disabled by switching the function disabling switch ON.

6. The vehicle power window control device of claim 5, wherein the function disabling switch is displayed on a display unit of a car navigation device disposed at an instrument panel of the vehicle.

7. The vehicle power window control device of claim 1, wherein:
    the opening-closing section and the detection section are respectively disposed at a plurality of the side doors including a driver seat side door; and
    the controller includes an operation switch that is disposed at an instrument panel, a center console, or a steering wheel of the vehicle and that is operated by an occupant seated in a driver seat, and the opening-closing sections respectively disposed at the side doors other than the driver seat side door can be activated by operating the operation switch.

8. The vehicle power window control device of claim 7, wherein the operation switch is displayed on a display unit of a car navigation device disposed at the instrument panel of the vehicle.

9. The vehicle power window control device of claim 1, wherein the detection section is disposed proximate to the vehicle front side of the door inner handle.

10. The vehicle power window control device of claim 1, wherein the detection section is disposed proximate to a vehicle rear side of a side register disposed at an instrument panel of the vehicle.

* * * * *